United States Patent [19]

Storm

[11] Patent Number: 5,663,498

[45] Date of Patent: Sep. 2, 1997

[54] VOLUME MEASUREMENT APPARATUS AND METHOD

[76] Inventor: Thomas W. Storm, 1602 Augusta Way, Casselberry, Fla. 32707

[21] Appl. No.: 582,347

[22] Filed: Jan. 19, 1996

[51] Int. Cl.⁶ ............................................. G01B 11/28
[52] U.S. Cl. ............................................. 73/149
[58] Field of Search ........................... 73/149; 33/1 V, 33/772, 773; 356/379, 380; 348/94, 135

[56] References Cited

U.S. PATENT DOCUMENTS

| | | |
|---|---|---|
| 3,681,747 | 8/1972 | Walsh . |
| 4,417,817 | 11/1983 | Bohme et al. ............ 356/380 |
| 4,773,029 | 9/1988 | Claesson et al. ............ 356/380 |
| 5,043,735 | 8/1991 | Mawhinney et al. . |
| 5,161,313 | 11/1992 | Rijlaarsadam ............ 33/773 |
| 5,202,740 | 4/1993 | Kivits . |
| 5,274,271 | 12/1993 | McEwan . |
| 5,422,861 | 6/1995 | Stringer et al. . |
| 5,477,622 | 12/1995 | Skalnik ............ 33/773 |

FOREIGN PATENT DOCUMENTS

| | | | |
|---|---|---|---|
| 0174722 | 10/1984 | Japan ............ | 356/380 |
| 0302106 | 12/1989 | Japan ............ | 33/1 V |

*Primary Examiner*—Robert Raevis
*Attorney, Agent, or Firm*—Paul S. Rooy

[57] ABSTRACT

A volume measurement apparatus and method of use. The volume measurement apparatus comprises a vertical leg attached to a horizontal leg, and at least one sensor attached to the legs. At least one measuring wheel is rotatably attached to the volume measurement apparatus, and is electrically connected to a measuring wheel travel detection means. A volume measurement means is electrically connected to the measuring wheel travel detection means and to the at least one sensor. The method of use includes the steps of rolling the volume measurement apparatus past an object whose volume is to be measured, such that the sensors will scan cross sectional areas of an object embraced within the volume measurement apparatus vertical leg and horizontal leg at pre-set intervals, figuring only the area that the sensor(s) report as solid, which is the object cross section return, and summing the products of the object cross section returns multiplied by the increment.

13 Claims, 7 Drawing Sheets

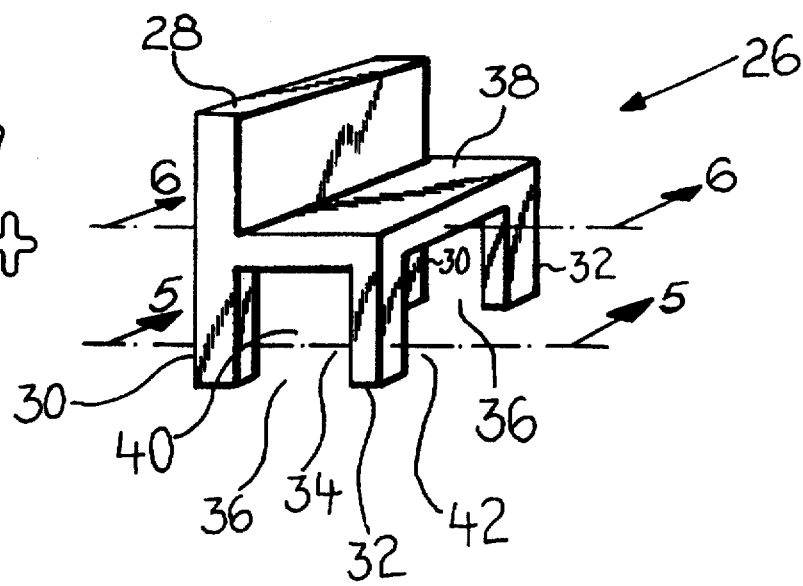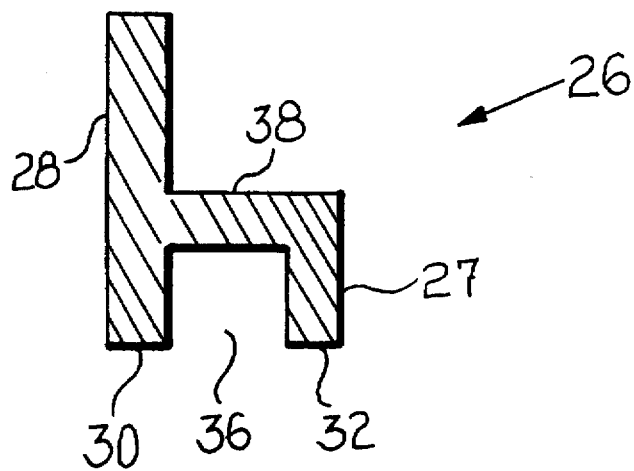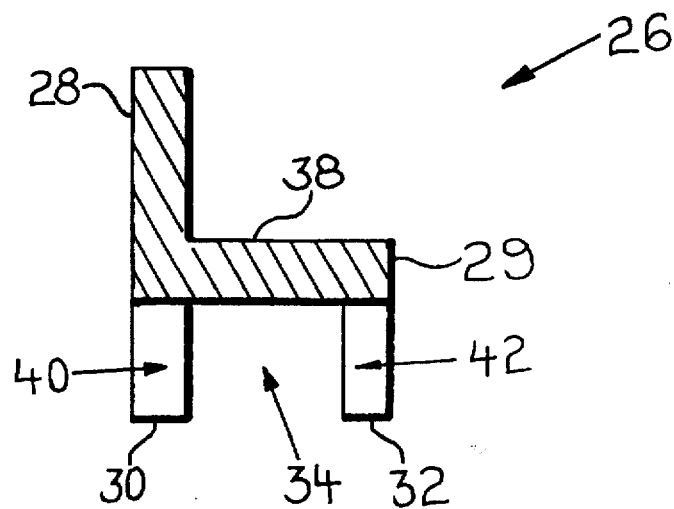

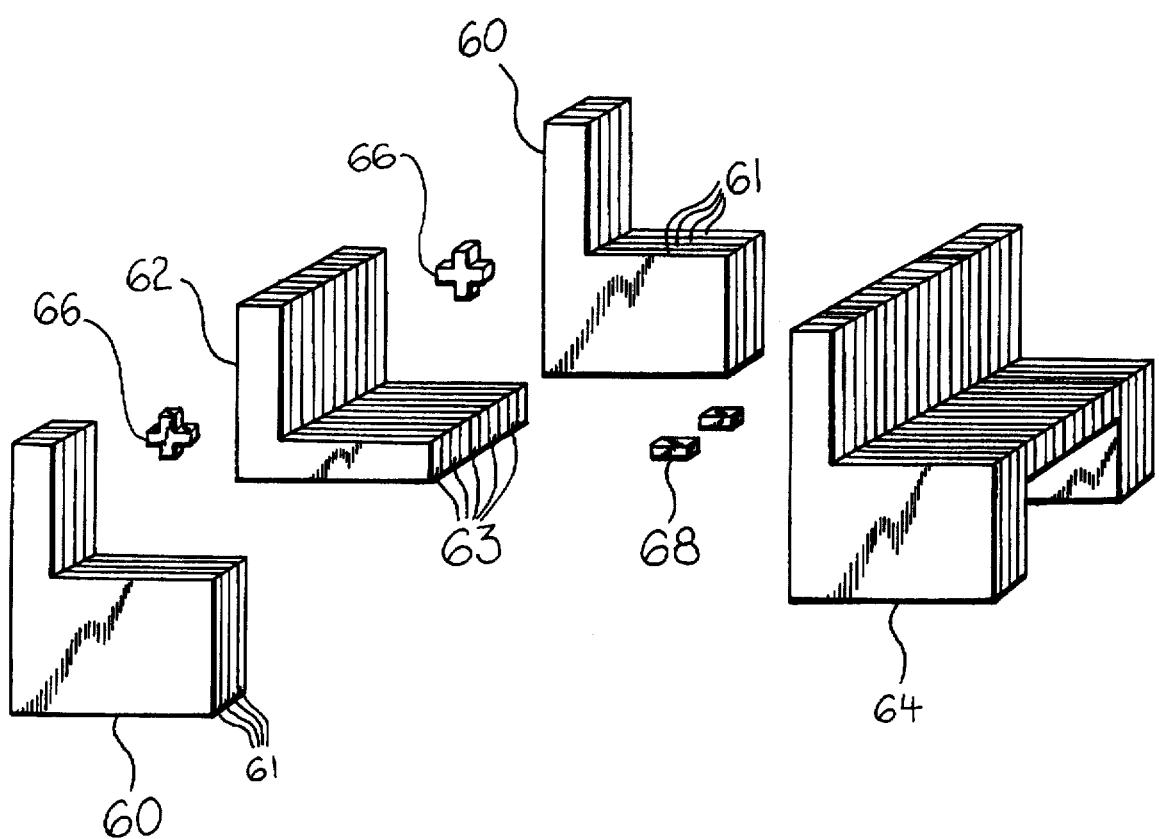

VOLUME MEASUREMENT APPARATUS AND METHOD

BACKGROUND OF THE INVENTION

1. Field of the Invention

This invention relates to measurement apparatus and methods, and in particular to a volume measurement apparatus and method.

2. Background of the Invention

The problem of volume measurement of disparately shaped goods has long defied simple solution. Since the dawn of human history, volume measurement of differently shaped objects has been important for a number of reasons: to be able to estimate the space required to store the items, to transport the items, to package the items, etc. For example, early sailing vessels incorporated only limited storage space for provisions, so effective trip logistics planning demanded accurate volume estimates of provisions— the survival of the crew and passengers could depend on it!

In more recent history, precise cubic volume measurement is crucial in ocean and air freight containerization, railroad box car and railroad container loading, efficient storage, and over-the-road shipment of lots comprising odd-shaped items such as household goods.

In addition, from the expense perspective, since the cost charged to store or to transport items is frequently linked to the cubic volume of the goods, it can be very costly to the shipper or the storage facility owner to underestimate the volume of goods. Similarly, a shipper or bailor's ability to accurately estimate cubic volume of goods to be shipped or stored facilitates more accurate cost quotes and contributes to the orderliness of these markets, to the benefit of the economy as a whole.

3. Existing Designs and Methods

Currently, hand tools such as measuring tapes and yardsticks are used to measure the volume of disparately-shaped goods. To take one example, in the area of household goods volume measurement, the cubic volume of a refrigerator or stove may be fairly readily estimated used a measuring tape. Volume measurement of more complex shapes such as sofas, desk chairs, loveseats, dining room chairs, tables, etc., however, is not so easily accomplished. Given these irregular shapes, visual estimation becomes necessary, with attendant inaccuracy. In fact, in the average household goods move, the cubic volume estimate at the quotation stage may contain errors as high as 10–20% or more. These erroneous estimates can contribute to the under-utilization of shipping resources, which leads to wasted shipping space, increased costs, and wasted fuel. These disadvantages operate to the detriment of not only the shipping and storage industry, but to the detriment of society at large.

SUMMARY OF THE INVENTION

Accordingly, it is an object of the present invention to provide a volume measurement apparatus and method which will accurately measure the cubic volume of complex-shaped three dimensional objects. Design features allowing this object to be accomplished include a first, second, and third sensor electrically connected to a volume measurement means. Advantages associated with the accomplishment of this object include increased transportation and storage efficiency, along with the associated cost and transportation fuel savings.

It is another object of the present invention to provide a volume measurement apparatus and method which is collapsible. Design features allowing this object to be accomplished include a telescoping volume measurement apparatus vertical leg and a telescoping volume measurement apparatus horizontal leg. Benefits associated with the accomplishment of this object include reduced collapsed size, along with the associated easier storage and transportation.

It is another object of this invention to provide a volume measurement apparatus and method which may be rolled along a number of different surfaces. Design features enabling the accomplishment of this object include measuring wheels disposed at different locations on the volume measurement apparatus. Advantage associated with the realization of this object include increased flexibility and ease of use.

It is still another object of this invention to provide a volume measurement apparatus and method which is easy to use. Design features allowing this object to be achieved include a plurality of conveniently placed measuring wheels electrically connected to a measuring wheel travel detection means, and first, second and third sensors electrically connected to a volume measurement means. Benefits associated with reaching this objective include reduced operator training costs, and ease of use.

BRIEF DESCRIPTION OF THE DRAWINGS

The invention, together with the other objects, features, aspects and advantages thereof will be more clearly understood from the following in conjunction with the accompanying drawings.

Seven sheets of drawings are provided. Sheet one contains FIG. 1, Sheet two contains FIG. 2. Sheet three contains FIG. 3. Sheet four contains FIGS. 4–6. Sheet five contains FIGS. 7–10. Sheet six contains FIGS. 11–14. Sheet seven contains FIG. 15.

FIG. 4 is a front isometric view of a chair.

FIG. 5 is a chair side cross section view taken at section 5—5 of FIG. 4.

FIG. 6 is a chair seat cross section view taken at section 6—6 of FIG. 4.

FIG. 15 is a side isometric view of two chair side volumes added to one chair seat volume to yield the chair volume.

DETAILED DESCRIPTION OF THE PREFERRED EMBODIMENT

Figure 1:
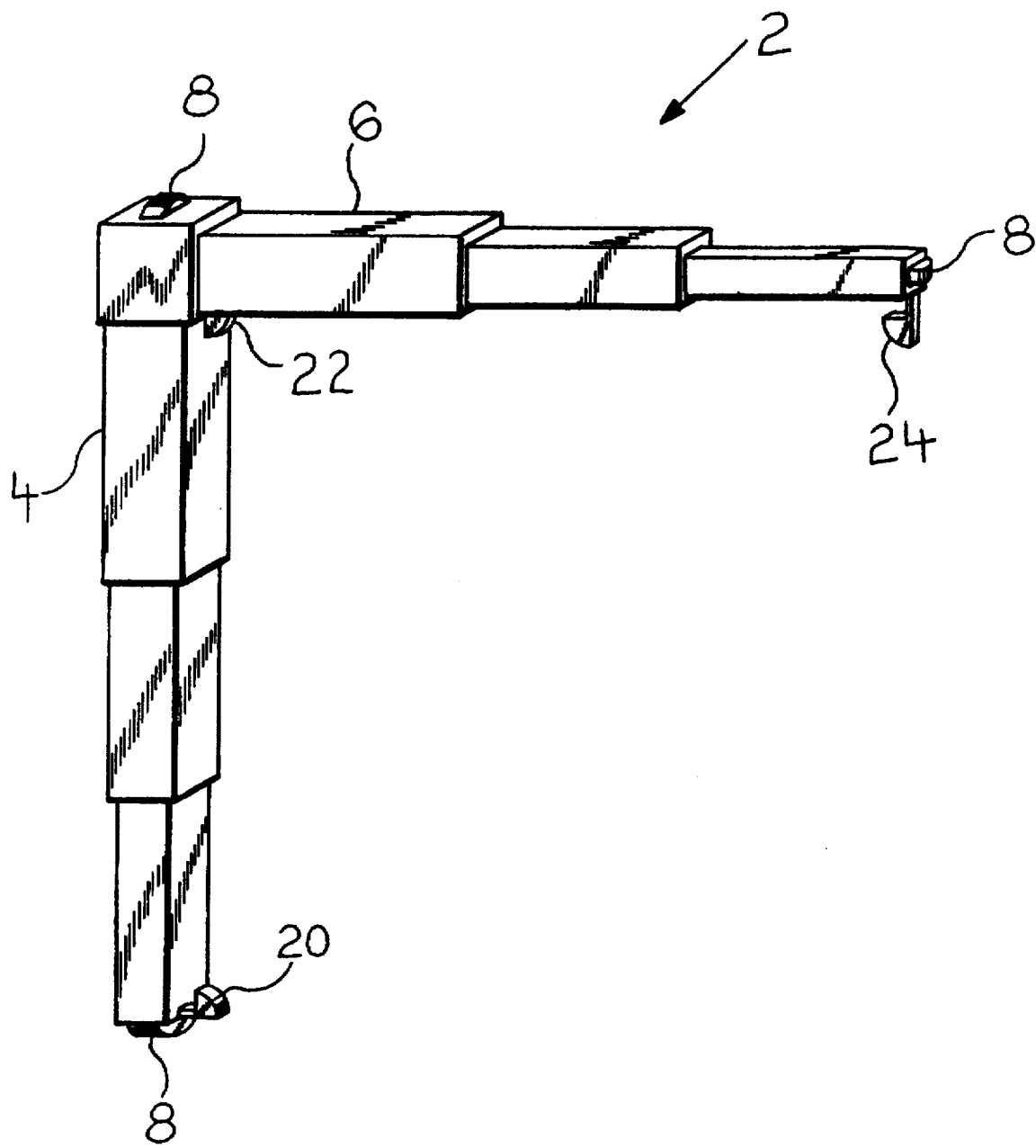
FIG. 1 is a front isometric view of a volume measurement apparatus.

FIG. 1 is a front isometric view of volume measurement apparatus 2. Volume measurement apparatus 2 comprises vertical leg 4 rigidly attached to horizontal leg 6 at an angle of approximately 90 degrees. Horizontal leg 6 and vertical leg 4 are extendible, so as to permit vertical leg 4 and horizontal leg 6 to be completely retracted in order to transport or store volume measurement apparatus 2.

Figure 2:
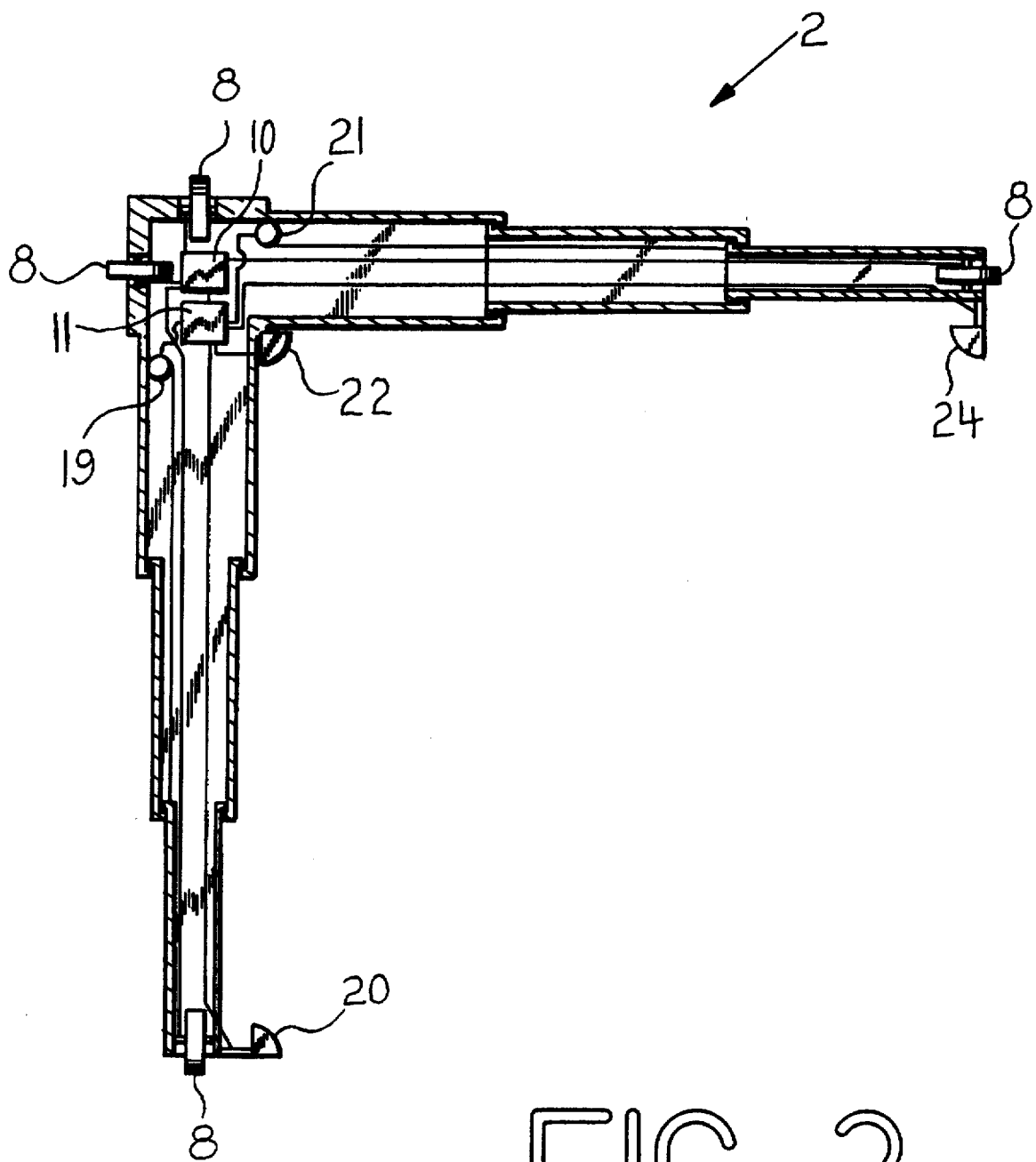
FIG. 2 is a cross sectional view of a volume measurement apparatus.

As may be observed in FIG. 2, volume measurement apparatus 2 further comprises vertical leg extension measurement means 19, which measures the extended length of vertical leg 4, and horizontal leg extension measurement means 21, which measures the extended length of horizontal leg 21. Vertical leg extension measurement means 19 and horizontal leg extension measurement means 21 are electrically connected to volume measurement 11. The leg extension values measured by vertical leg extension measurement means 19 and horizontal leg extension measurement means 21 are transmitted to volume measurement means 11 for use in the volume measurement function.

Measuring wheels 8 are rotatably attached to volume measurement apparatus 2 at a plurality of locations. First sensor 20 is attached to an extreme of vertical leg 4 opposite horizontal leg 6. Second sensor 22 is attached to volume measurement apparatus 2 at the junction of vertical leg 4 and horizontal leg 6. Third sensor 24 is attached to an extreme of horizontal leg 6 opposite vertical leg 4.

FIG. 2 is a cross section view of volume measurement apparatus 2. Sensors 20, 22 and 24 are electrically connected to volume measuring means 11. Measuring wheels 8 are electrically connected to measuring wheel travel detection means 10. Sensors 20, 22, and 24, vertical leg extension measurement means 19, horizontal leg extension measurement means 21, and measuring wheel travel detection means 10, are electrically connected to volume measurement means 11.

Figure 3:
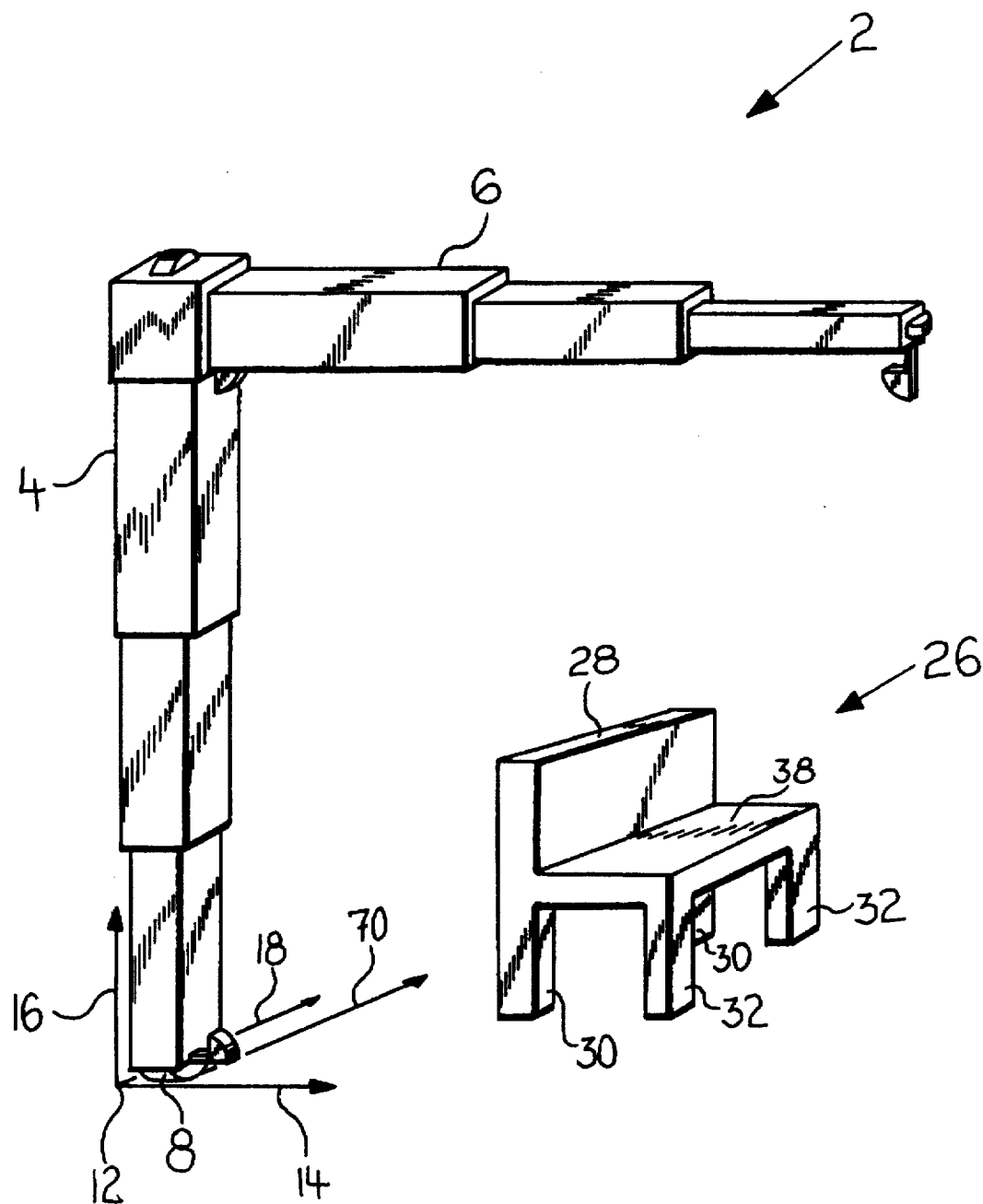
FIG. 3 is a front isometric view of a volume measurement apparatus in position ready to measure the volume of a chair.

FIG. 3 is a front isometric view of volume measurement apparatus 2 in position ready to measure the volume of chair 26. Chair 26 comprises chair back 28 attached to chair seat 38. Chair rear legs 30 and chair front legs 32 are also attached to chair seat 38.

It will be useful to make reference to a three-dimensional Cartesian coordinate system in the following description of how volume measurement apparatus 2 works. Accordingly, origin 12 is disposed at a point where a measuring wheel 8, rotatably attached to an extreme of vertical leg 4 opposite horizontal leg 6, contacts a horizontal flat surface when volume measurement apparatus 2 is in position ready to measure the volume of chair 26. Chair 26 also rests upon the flat surface. X axis 14 and Z axis 18 are mutually perpendicular and are disposed in the flat surface upon which measuring wheel 8 and chair 26 rest. Y axis 16 is perpendicular to X axis 14 and Z axis 18, and is normal to the flat surface upon which chair 26 rests. X axis 14, Y axis 16 and Z axis 18 intersect at origin 12. When the volume of chair 26 is to be measured, a measuring wheel 8 is rolled along Z axis 18 as indicated by arrow 70, while maintaining volume measurement apparatus vertical leg 4 parallel to Y axis 16 and volume measurement apparatus horizontal leg 6 parallel to X axis 14.

FIG. 4 is a front isometric view of chair 26. Chair rear intra-leg void 40 is disposed under chair seat 38, between chair rear legs 30. Chair front intra-leg void 42 is disposed under chair seat 38, between chair front legs 32. Chair side intra-leg voids 36 are disposed under chair seat 38, between each chair rear leg 30/chair front leg 32 pair. Chair central void 34 is centrally disposed under chair seat 38.

FIG. 5 is a side cross sectional view of chair 26 taken at section 5—5 of FIG. 4, which is chair side cross section 27. Chair side cross section 27 comprises cross section of a front leg 32 and a chair rear leg 30 taken from the same side of chair 26, as well as a cross section of chair back 28 and chair seat 38. Chair side intra-leg void 36 is disposed under chair seat 38, between rear leg 30 and front leg 32.

FIG. 6 is a cross section view of chair 26 taken at section 6—6 of FIG. 4, which comprises chair seat cross section 29. Chair seat cross section 29 comprises a cross section of chair back 28 and a cross section of chair seat 38. Chair central void 34 is disposed under chair seat 38. Chair rear intra-leg void 40 is disposed under chair seat 38, between chair rear legs 30, and chair front intra-leg void 42 is disposed under chair seat 38, between chair front legs 32.

As is depicted in FIGS. 5–14, volume measurements apparatus 2 functions by scanning an object (such as chair 26) at regular intervals along Z axis 18 while volume measurement apparatus 2 is rolled along Z axis 18 on a measuring wheel 8, as indicated by arrow 70 (see FIG. 3). For example in the preferred embodiment, first sensor 20, second sensor 22 and third sensor 24 are set to emit a scan and detect a return at one inch increments along Z axis 18. This is accomplished by virtue of the electric connection between measuring wheels 8 and measuring wheel travel detection means 10, between wheel travel detection means 10 and volume measurement means 11, and between first sensor 20, second sensor 22, and third sensor 24 and volume measurement means 11 (see FIG. 2). Once volume measuring means 11 has been activated, the rotation of a measuring wheel 8 signals measuring wheel travel detection means 10 each time volume measurement apparatus 2 reaches a one-inch increment along Z axis 18. At each pre-set Z axis 18 increment (one inch Z axis 18 intervals in the preferred embodiment), measuring wheel travel detection means 10 instructs first sensor 20, second sensor 22, and third sensor 24 to scan the object whose volume is being measured (chair 26 in this example).

FIG. 3 depicts volume measurement apparatus 2 in position, ready to measure the volume of chair 26. As volume measurement apparatus 2 is moved in the direction indicated by arrow 70, first sensor 20, second sensor 22 and third sensor 24 simultaneously scan chair 26 at predetermined increments along Z axis 18. As may be observed in FIG. 3, volume measurement apparatus 2 will initially scan the nearest chair side cross section 27, depicted in FIG. 5. For the purposes of the present example, if the nearest chair side cross section 27 is 4 inches wide (as measured along Z axis 18), volume measurement apparatus 2 will detect and sum four chair side volume area increments 61 totaling one chair side volume 60 (see FIG. 15).

As volume measurement apparatus 2 continues travel along Z axis 18 (as indicated by arrow 70) past the nearest chair side cross section 27, the next part of chair 26 scanned will be chair seat cross section 29, depicted in FIG. 6. For the purpose of the present example, if chair seat cross section 29 is ten inches wide (as measured along Z axis 18), volume measurement apparatus 2 will detect and sum the volumes of ten seat volume area increments 63 totaling chair seat volume 62 (see FIG. 15).

As volume measurement apparatus 2 continues travel along Z axis 18 (as indicated by arrow 70) past chair seat cross section 29, the final part of chair 26 scanned will be farthest chair side cross section 27, as is depicted in FIG. 5. For the purpose of the present example, if the farthest chair side cross section 27 is four inches wide (as measured along Z axis 18), volume measurement apparatus 2 will detect four chair side volume increments 61 which sum a yield a chair side volume 60 four inches wide (see FIG. 15).

At each scan increment along Z axis 18 during a given volume measurement run, volume measuring means 11 counts how many units of area (e.g. square inches) are contained in a cross section scanned. After each such count, volume measurement apparatus 2 multiples the cross section area scanned by the Z-axis scan increment to yield a volume increment, and then sums this volume increment to those calculated thus far during the volume measurement run, which yields the volume scanned through the latest count. At the end of a given volume measurement run, volume measurement apparatus 2 has taken the last run scan, and volume measuring means 11 has summed all of the run volume increments, in order to yield the total volume of the object whose volume was being measured.

The method which volume measurement apparatus 2 employs to measure the incremental cross sectional areas of the object to be measured (chair side volume area increments 61 and chair seat volume area increments 63 in the present example) is described in the following paragraphs, and illustrated in FIGS. 7–14.

Figure 7:
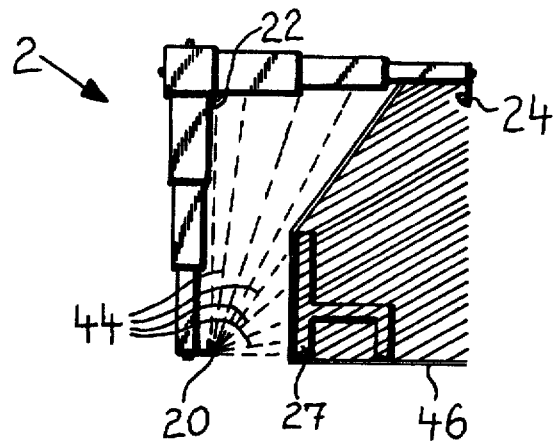
FIG. 7 is a side view of a first sensor scanning a chair side cross section.

FIGS. 7–10 illustrate the method which volume measurement apparatus 2 employs to measure chair side volume area increments 61. FIGS. 7–10 depict first sensor 20, second sensor 22, and third sensor 24 scanning chair side cross section 27. FIG. 7 is a side view of first sensor 20 scanning chair side cross section 27. First sensor 20 emits first sensor scan 44, which impinges on chair side cross section 27, yielding a first sensor return 46 (delimited by a double line containing 30° ascending hatching), which is detected by first sensor 20. The disposition of first sensor return 46 is communicated to volume measuring means 11.

Figure 8:
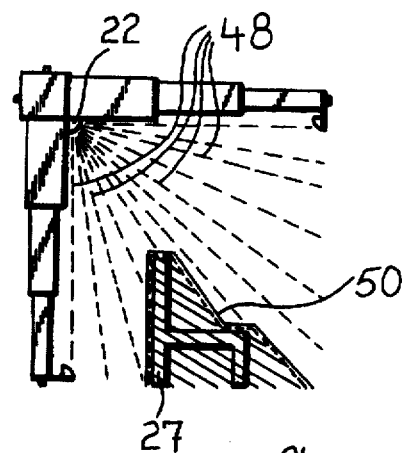
FIG. 8 is a side view of a second sensor scanning a chair side cross section.

FIG. 8 is a side view of second sensor 22 simultaneously scanning chair side cross section 27. Second sensor 22 emits second sensor scan 48, which impinges on chair side cross section 27, yielding second sensor return 50 (delimited by a solid line outside a dashed line containing 30° descending hatching), which is detected by second sensor 22. The disposition of second sensor return 50 is communicated to volume measuring means 11.

Figure 9:
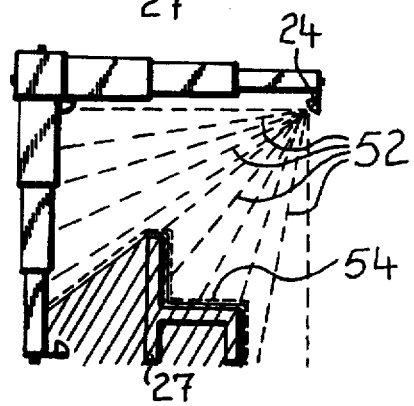
FIG. 9 is a side view of a third sensor scanning a chair side cross section.

FIG. 9 is a side view of third sensor 24 simultaneously scanning chair side cross section 27. Third sensor 24 emits third sensor scan 52, which impinges on chair side cross section 27, yielding a third sensor return 54 (delimited by a dashed line outside a solid line containing 60° ascending hatching), which is detected by third sensor 24. The disposition of third sensor return 54 is communicated to volume measuring means 11.

Figure 10:
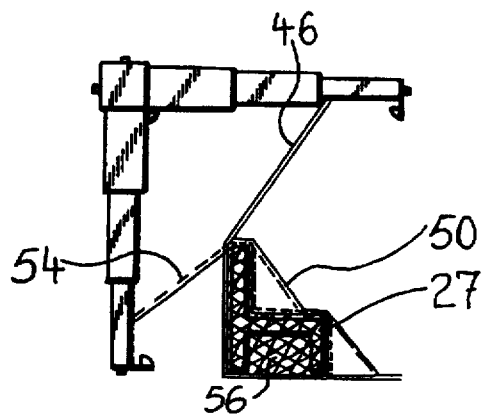
FIG. 10 is a side view of the summation of the scans of a first sensor, a second sensor, and a third sensor, of a chair side cross section.

FIG. 10 is a side view of sensors 29, 22, and 24 simultaneously scanning chair side cross section 27 (as described in the preceding three paragraphs) and generating sensor returns 46, 50 and 54, which combine to yield chair side cross section return 56 (identified by triple hatching). Volume measuring means 11 counts only the area that all three sensors 20, 22 and 24 report as solid, which is chair side cross section return 56 (identified by triple hatching).

Volume measuring means 11 adds the product of the area of chair side cross section return 56 multiplied by the Z axis increment (1 inch in the present example), to the previously measured and summed chair side volume increments 61.

Thus when volume measurement apparatus 2 has rolled past chair side volume 60, volume measuring means 11 has summed four chair side volume increments 61 to arrive at chair side volume 60 (see FIG. 15). In the present example note that although chair side intra-leg voids 36 are interpreted by volume measurement apparatus 2 as solid material and therefore summed into chair volume 64, chair rear intra-leg void 40, chair front intra-leg void 42 and chair central void 34 are correctly perceived by volume measurement apparatus 2 as voids, and not includes in chair volume 64. Therefore, even through chair side intra-leg voids 36 are not actually a solid part of chair 26, they are included in chair side volumes 60 as small but acceptable volume measurement errors.

FIGS. 11–14 illustrate the method which volume measurement apparatus 2 employs to measure chair seat volume area increments 63. FIGS. 11–14 depict first sensor 20, second sensor 22, and third sensor 24 scanning chair seat cross section 29.

Figure 11:
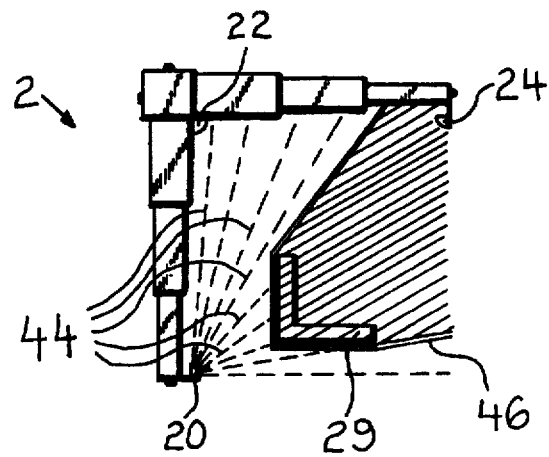
FIG. 11 is a side view of a first sensor scanning a chair seat cross section.

FIG. 11 is a side view of first sensor 20 scanning chair seat cross section 29. First sensor 20 emits first sensor scan 44, which impinges on chair seat cross section 29, yielding a first sensor return 46 (delimited by a double solid line containing 30° ascending hatching), which is detected by first sensor 20. The disposition of first sensor return 46 is communicated to volume measuring means 11.

Figure 12:
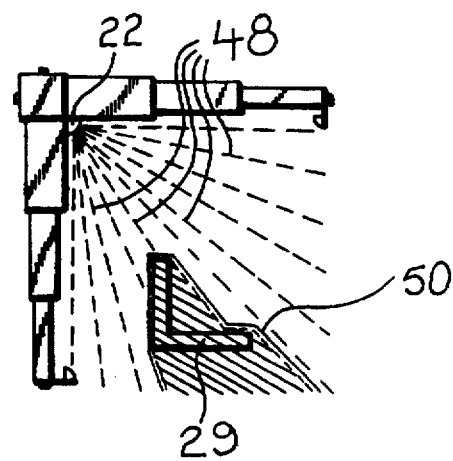
FIG. 12 is a side view of second sensor scanning a chair seat cross section.

FIG. 12 is a side view of second sensor 22 simultaneously scanning chair seat cross section 29. Second sensor 22 emits second sensor scan 48, which impinges on chair seat cross section 29, yielding second sensor return 50 (delimited by a solid line outside a dashed line containing 30° descending hatching), which return is detected by second sensor 22. The disposition of second sensor return 50 is communicated to volume measuring means 11.

Figure 13:
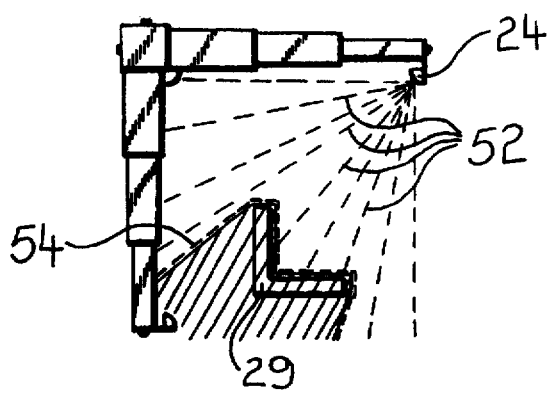
FIG. 13 is a side view of a third sensor scanning a chair seat cross section.

FIG. 13 is a side view of third sensor 24 simultaneously scanning chair seat cross section 29. Third sensor 24 emits third sensor scan 52, which impinges on chair seat cross section 29, yielding a third sensor return 54 (delimited by a dashed line outside a solid line containing 60° ascending hatching), which is detected by third sensor 24. The disposition of third sensor return 54 is communicated to volume measuring means 11.

Figure 14:
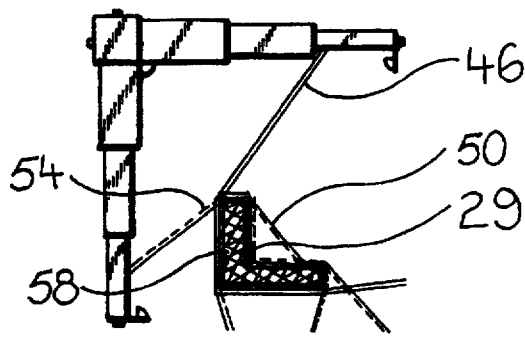
FIG. 14 is a side view of the summation of the scans of a first sensor, a second sensor, and a third sensor, of a chair seat cross section.

FIG. 14 is a side view of sensors 20, 22, and 24 simultaneously scanning chair seat cross section 29 and generating sensor returns 46, 50 and 54, which combine to yield chair seat cross section return 58 (identified by triple hatching). Volume measuring means 11 figures only the area that all three sensors 20, 22 and 24 report as solid, which is chair seat cross section return 58 (identified by triple hatching).

Volume measuring means 11 adds the product of the area of chair seat cross section return 58 multiplied by the Z axis increment (1 inch in the present example), to the previously calculated and summed chair seat volume increments. Thus when volume measurement apparatus 2 has rolled past chair seat volume 62 (as depicted in FIG. 15), volume measuring means 11 has summed ten chair seat volume increments 63 to arrive at the chair seat volume 62.

FIG. 15 is a side isometric view of two chair side volumes 60 added to one chair seat volume 62 (as illustrated by addition signs 66), to yield chair volume 64 (as is illustrated by equal sign 68). In the present example, each chair side volume 60 comprises four chair side volume area increments 61, and chair seat volume 62 comprises ten chair seat volume area increments 63.

In the instant example, a measuring wheel 8 disposed at an extreme of vertical leg 4 opposite horizontal leg 8 was rolled across a flat surface upon which chair 26 rested. The rotation of this measuring wheel 8 was transmitted to measuring wheel travel detection means 10, which in turn instructed sensors 20, 22 and 24 when to operate—in this case, once every inch of measuring wheel 8 travel. Note, however, that a different measuring wheel 8 may be employed for the same purpose, depending on the location of a convenient flat rolling surface relative to an object whose volume is to be measured. For example, the measuring wheels 8 disposed at either extreme of horizontal leg 6 may be rolled along a convenient vertical flat surface such as a wall, and a measuring wheel 8 disposed at an extreme of vertical leg 4 opposite first sensor 29 may be rolled along a convenient flat surface such as a ceiling or the underside of a flat shelf.

METHOD OF USE

A. Place volume measurement apparatus 2 at its starting position. Three-dimensional Cartesian coordinate system origin 12 is now located at a point where a measuring wheel 8 contacts a convenient flat rolling surface, and the measuring wheel 8 is oriented to roll parallel to Z axis 16. Volume measurement apparatus vertical leg 4 is aligned with Y axis 18, and volume measurement apparatus horizontal leg 6 is parallel with X axis 14.

B. Reset volume measurement apparatus 2 to indicate zero volume measured.

C. Initiate the volume measurement function of volume measurement apparatus 2.

D. Roll volume measurement apparatus 2 parallel to Z axis 16 as indicated by arrow 70 in FIG. 3. Sensors 20, 22, and 24 will scan cross sectional areas of an object embraced within volume measurement apparatus vertical leg 4 and volume measurement apparatus horizontal leg 6 at one-inch intervals along Z axis 16.

E. Volume measuring means 11 figures only the area that all three sensors 20, 22 and 24 report as solid, which is the object cross section return. Volume measuring means 11 adds the product of the object cross section return multiplied by the Z axis increment (1 inch in the present example), to the previously calculated and summed object volume increments.

F. When volume measurement apparatus 2 has rolled along Z axis 18 completed past an object being measured, a volume measurement apparatus 2 operator ceases the volume measurement function, and the volume measured in the sum of products of the incremental areas measured multiplied by the Z axis measurement increment (one inch in the present example). In the present example, the volume of the object being measured thus calculated is expressed in cubic inches.

In the preferred embodiment, sensors 20, 22 and 24 were miniature radars utilizing technology such as is taught in McEwan U.S. Pat. No. 5,274,271, which patent is hereby incorporated in its entirely by reference. Additional technologies which may be employed in the instant invention include those taught in Walsh U.S. Pat. No. 3,681,747, Wawhinney et al. U.S. Pat. No. 5,043,735, and Kivits U.S. Pat. No. 5,202,740 which patents are hereby incorporated in their entirety by reference. The inventor wishes to make clear, however, that the scope of the invention is intended to include any sensor means, including but not limited to radars, sonars, X-rays, infra-red, etc.

Measuring wheel travel detection means 10 and measuring wheels 8 comprised standard rotary distance measuring apparatus, such as is routinely used by mechanical draftsmen to measure drawing line lengths (or on larger scale, by vehicles to measure distance traveled). Volume measuring means 11 was an integrated circuit calibrated to superimpose sensor returns 46, 50 and 54 in order to figure object cross sectional areas, and to sum the products of progressive object cross sectional areas multiplied by a Z-axis increment. The inventor wishes to make clear, however, that the scope of this invention is intended to include any volume measuring means, including but not limited to digital, analogue, electrical, electronic, electro-mechanical, etc.

Vertical leg extension measurement means 19 and horizontal leg extension measurement means 21 comprised a wire spool having a free wire end connected to an extreme of a leg whose extension was to be measured, spring-loaded in the retracted position, connected to a rotary distance measurement apparatus similar to measuring wheel travel detection means 11 combined with a measuring wheel 8. Vertical leg extension measurement means 19 and horizontal leg extension measurement means 21 were electrically connected to volume measurement means 11, whereby volume measurement means 11 was informed as to the size of the area embraced by vertical leg 4 and horizontal leg 6, and thus be able to measure the areas of cross sectional returns.

While a preferred embodiment of the invention has been illustrated herein, it is to be understood that changes and variations may be made by those skilled in the art without departing from the spirit of the appending claims.

DRAWING ITEM INDEX 2 volume measurement apparatus
4 vertical leg
6 horizontal leg
8 measuring wheel
10 measuring wheel travel detection means
11 volume measurement means
12 origin
14 X axis
16 Y axis
18 Z axis
19 vertical leg extension measurement means
20 first sensor
21 horizontal leg extension measurement means
22 second sensor
24 third sensor
26 chair
27 chair side section
28 chair back
29 chair seat section
30 chair rear leg
32 chair front leg
34 chair central void
36 chair side intra-leg
38 chair seat
40 chair rear intra-leg void
42 chair front intra-leg void
44 first sensor scan
46 first sensor return
48 second sensor scan
50 second sensor return
52 third sensor scan
54 third sensor scan
56 chair side cross section return
58 chair seat cross section return
60 chair side volume
61 chair side volume increment
62 chair seat volume
63 chair seat volume increment 64 chair volume
66 addition signs
68 equal sign
70 arrow

I claim:

1. A volume measurement apparatus comprising a vertical leg attached to a horizontal leg, a first sensor disposed at an extreme of said vertical leg opposite said horizontal leg, a second sensor disposed at an extreme of said horizontal leg opposite said vertical leg, a third sensor disposed at an intersection of said vertical leg and said horizontal leg, and a volume measurement means electrically connected to the sensors, said sensors being mapping type sensors which both emit a signal and detect a signal return reflected from an object being scanned, said signal return defining a contour of the object being scanned, whereby a shape of the object being scanned is defined in said return.

2. The volume measurement apparatus of claim 1 further comprising at least one measuring wheel rotatably attached to said volume measurement apparatus, and a measuring wheel travel detection means electrically connected to said at least one measuring wheel and to said volume measurement means.

3. The volume measurement apparatus of claim 2 wherein said vertical leg and said horizontal leg are extendible, whereby said volume measurement apparatus may be easily transported and stored.

4. The volume measurement apparatus of claim 3 further comprising a vertical leg extension measurement means electrically connected to said volume measurement means, and a horizontal leg extension measurement means electrically connected to said volume measurement means, whereby extensions of said vertical leg and said horizontal leg may be measured.

5. The volume measurement apparatus of claim 2 wherein said measuring wheel is rotatably attached to said volume measurement apparatus at an extreme of said vertical leg opposite said horizontal leg.

6. The volume measurement apparatus of claim 5 further comprising a measuring wheel rotatably attached to said volume measurement apparatus at an extreme of said horizontal leg opposite said vertical leg.

7. The volume measurement apparatus of claim 6 further comprising at least one measuring wheel rotatably attached to one of the legs at an intersection of said horizontal leg and said vertical leg.

8. The volume measurement apparatus of claim 1 wherein said sensors are miniature radars.

9. A method of measuring volume using a volume measurement apparatus, said volume measurement apparatus comprising a vertical leg attached to a horizontal leg, a first sensor disposed at an extreme of said vertical leg opposite said horizontal leg, a second sensor disposed at an extreme of said horizontal leg opposite said vertical leg, a third sensor disposed at an intersection of said vertical leg and said horizontal leg, at least one measuring wheel rotatably attached to said volume measurement apparatus, a measuring wheel travel detection means electrically connected to said at least one measuring wheel, and a volume measurement means electrically connected said to said measuring wheel travel detection means and to the sensors, said sensors being mapping type sensors which both emit a signal and detect a signal return reflected from an object being scanned, said signal return defining a contour of the object being scanned, said method comprising the following steps:

A. Placing said volume measurement apparatus at a starting position where one said at least one measuring wheel contacts a rolling surface;

B. Rolling said volume measurement apparatus past an object whose volume is to be measured such that the sensors will scan cross sectional areas of the object embraced within said volume measurement apparatus vertical leg and said volume measurement apparatus horizontal leg at pre-set increments;

C. Figuring only an area that all three said sensors report as solid, which is an object cross section return; and D. Summing the products of the object cross section returns multiplied by said increment.

10. The method of measuring volume of claim 8 further comprising the intermediate steps of:

A1. Resetting said volume measurement apparatus to indicate zero volume measured; and A2. Initiating a volume measurement function of said volume measurement apparatus.

11. A volume measurement apparatus comprising a vertical leg attached to a horizontal leg, and at least three sensors mounted to said legs, said sensors being electrically connected to a volume measurement means, said sensors being mapping type sensors which both emit a signal and detect a signal return reflected from an object being scanned, said signal return defining a contour of the object being scanned, a first said sensor being disposed at an extreme of said vertical leg opposite said horizontal leg, a second said sensor being disposed at an extreme of said horizontal leg opposite said vertical leg, and a third said sensor being disposed at an intersection of said vertical leg and said horizontal leg.

12. The volume measurement apparatus of claim 11 further comprising at least one measuring wheel rotatably attached to said volume measurement apparatus, a measuring wheel travel detection means electrically connected to said at least one measuring wheel and to said volume measurement means, and a method of use comprising the following steps:

A. Placing said volume measurement apparatus at a starting position where one said at least one measuring wheel contacts a rolling surface;

B. Rolling said volume measurement apparatus past an object whose volume is to be measured, such that the sensors will scan cross sectional areas of the object embraced within said volume measurement apparatus vertical leg and said volume measurement apparatus horizontal leg at pre-set increments;

C. Figuring only an area that said sensors report as solid, which is an object cross section return; and D. Summing products of the object cross section returns multiplied by said increment.

13. The method of measuring volume of claim 12 further comprising the intermediate steps of:

A1. Resetting said volume measurement apparatus to indicate zero volume measured; and A2. Initiating a volume measurement function of said volume measurement apparatus.

* * * * *

UNITED STATES PATENT AND TRADEMARK OFFICE
CERTIFICATE OF CORRECTION

PATENT NO. : 5,663,498
DATED : September 2, 1997
INVENTOR(S) : Thomas W. Storm

Page 1 of 2

It is certified that error appears in the above-identified patent and that said Letters Patent is hereby corrected as shown below:

| | |
|---|---|
| Column 1 line 7 | "..apparatus.." *should read* "..apparatuses.." |
| Column 1 line 41 | "..used.." *should read* "..using.." |
| Column 2 line 13 | "Advantage.." *should read* "Advantages.." |
| Column 2 line 24 | "..costs.." *should read* "..cost.." |
| Column 3 line 20 | "..volume measurement 11.." *should read* "..volume measurement means 11.." |
| Column 3 line 33 | "..cross section.." *should read* "..cross sectional.." |
| Column 4 line 8 | "..comprises cross section.." *should read* "..comprises cross sections.." |
| Column 4 line 21 | "..FIGS. 5-14.." *should read* "..FIGS. 5-15.." |
| Column 4 line 21 | "..measurements.." *should read* "..measurement.." |
| Column 4 line 61 | "..purpose.." *should read* "..purposes.." |
| Column 5 line 3 | "..purpose.." *should read* "..purposes" |
| Column 5 line 6 | "..sum a yield.." *should read* "..sum to yield.." |
| Column 5 line 56 | "..view of sensors 29,.." *should read* "..view of sensors 20,.." |
| Column 6 line 10 | " includes.." *should read* "..included.." |
| Column 7 line 13 | "..first sensor 29.." *should read* --first sensor 20-- |
| Column 7 line 45 | "..completed.." *should read* "..completely.." |
| Column 7 line 47 | "..volume measured in.." *should read* "..volume measured is.." |
| Column 7 line 56 | "..in its entirely.." *should read* "..in its entirety.." |
| Column 8 line 52 | "..36 chair side intra leg.." *should read* "..36 chair side intra-leg void.." |
| Column 8 line 61 | "..54 third sensor scan.." *should read* "..54 third sensor return.." |
| Column 10 line 16 | "..of claim 8.." *should read* "..of claim 9.." |
| Column 10 line 47 | "..such that the.." *should read* "..such that said.." |

UNITED STATES PATENT AND TRADEMARK OFFICE
CERTIFICATE OF CORRECTION

PATENT NO. : 5,663,498
DATED : September 2, 1997
INVENTOR(S) : Thomas W. Storm

It is certified that error appears in the above-identified patent and that said Letters Patent is hereby corrected as shown below:

Column 10 line 52 "Figuring only an.." *should read* "Figuring an.."

Signed and Sealed this

Twentieth Day of January, 1998

Attest:

BRUCE LEHMAN

*Attesting Officer*  *Commissioner of Patents and Trademarks*